United States Patent
Kim et al.

(10) Patent No.: US 10,320,460 B2
(45) Date of Patent: Jun. 11, 2019

(54) METHOD FOR TRANSMITTING SIGNAL THROUGH HIGH-FREQUENCY BAND IN WIRELESS COMMUNICATION SYSTEM, AND APPARATUS THEREFOR

(71) Applicant: LG ELECTRONICS INC., Seoul (KR)

(72) Inventors: Kitae Kim, Seoul (KR); Heejin Kim, Seoul (KR); Kukheon Choi, Seoul (KR); Jiwon Kang, Seoul (KR); Kilbom Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/320,285

(22) PCT Filed: Jun. 24, 2014

(86) PCT No.: PCT/KR2014/005561
§ 371 (c)(1),
(2) Date: Dec. 19, 2016

(87) PCT Pub. No.: WO2015/199252
PCT Pub. Date: Dec. 30, 2015

(65) Prior Publication Data
US 2017/0149479 A1    May 25, 2017

(51) Int. Cl.
*H04B 7/0456* (2017.01)
*H04B 7/06* (2006.01)
(Continued)

(52) U.S. Cl.
CPC ......... *H04B 7/0617* (2013.01); *H04B 7/0417* (2013.01); *H04B 7/0434* (2013.01);
(Continued)

(58) Field of Classification Search
CPC .. H04B 7/0417; H04B 7/0617; H04B 7/0619; H04B 7/0621; H04B 7/0626;
(Continued)

(56) References Cited

U.S. PATENT DOCUMENTS

2012/0051282 A1\* 3/2012 Kruglick ............... H04L 1/0026
370/315
2016/0329942 A1\* 11/2016 Zhu ...................... H04B 7/0456

FOREIGN PATENT DOCUMENTS

KR   1020110090286    8/2011
KR   1020110102795    9/2011
(Continued)

OTHER PUBLICATIONS

PCT International Application No. PCT/KR2014/005561, Written Opinion of the International Searching Authority dated Feb. 27, 2015, 19 pages.

*Primary Examiner* — Betsy Deppe
(74) *Attorney, Agent, or Firm* — Lee, Hong, Degerman, Kang & Waimey

(57) ABSTRACT

A method for a transmitting end transmitting a signal to a receiving end in a wireless communication system is provided. The method includes receiving, from the receiving end, information on a first precoder and a second precoder which are for a channel between the transmitting end and the receiving end and transmitting a signal to the receiving end based on the first precoder where the signal is transmitted to the receiving end based on the second precoder if the receiving performance of the receiving end based on the first precoder is greater than or equal to a threshold value.

6 Claims, 5 Drawing Sheets

(51) Int. Cl.
*H04B 7/0417* (2017.01)
*H04L 1/06* (2006.01)
*H04B 7/0426* (2017.01)
*H04L 25/03* (2006.01)

(52) U.S. Cl.
CPC ......... *H04B 7/0456* (2013.01); *H04B 7/0628* (2013.01); *H04L 1/06* (2013.01); *H04L 25/03343* (2013.01); *H04B 7/0486* (2013.01); *H04L 25/03898* (2013.01)

(58) Field of Classification Search
CPC ...... H04B 7/628; H04B 7/063; H04B 7/0632; H04B 7/0634; H04B 7/0686; H04B 7/0434; H04B 7/0628; H04B 7/0456
See application file for complete search history.

(56) References Cited

FOREIGN PATENT DOCUMENTS

| | | |
|---|---|---|
| KR | 1020120049368 | 5/2012 |
| KR | 1020130038375 | 4/2013 |
| KR | 101335898 | 12/2013 |

* cited by examiner

METHOD FOR TRANSMITTING SIGNAL THROUGH HIGH-FREQUENCY BAND IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2014/005561, filed on Jun. 24, 2014, the contents of which are hereby incorporated by reference herein in their entirety.

TECHNICAL FIELD

The present invention relates to a wireless communication system, and more particularly, to a method of transmitting a signal through a high frequency band in a wireless communication system and an apparatus therefor.

BACKGROUND ART

A legacy beamforming technique using multiple antennas can be mainly classified into an analog beamforming technique and a digital beamforming technique depending on a location to which a beamforming weight vector/precoding vector is applied.

First of all, the analog beamforming technique is a typical beamforming technique applied to an initial multi-antenna structure. The analog beamforming technique divides an analog signal of which digital signal processing is completed into a plurality of paths and sets phase-shift (PS) and power amplification (PA) to each of a plurality of the paths to perform beamforming. FIG. 1 is a diagram for an example of a legacy analog beamforming technique.

Referring to FIG. 1, it is able to see a structure that an analog signal derived from a single digital signal is processed by a power amplifier and a phase shifter connected to each antenna to perform analog beamforming. In particular, the phase shifter and the power amplifier process complex weights at an analog stage. In this case, a radio frequency (RF) chain corresponds to a processing block in which a single digital signal is converted into an analog signal.

However, according to the analog beamforming technique, since accuracy of a beam is determined according to characteristics of elements of the phase shifter and the power amplifier, the analog beamforming technique is advantageous for the narrow band transmission due to the control characteristics of the elements. On the other hand, since the analog beamforming technique has a hardware structure incapable of implementing multi-stream transmission, multiplexing gain for increasing a transmission rate is relatively small and it is difficult to perform beamforming per user based on orthogonal resource allocation.

Unlike the analog beamforming technique, the digital beamforming technique performs beamforming at a digital stage using a baseband process to maximize diversity and multiplexing gain in MIMO environment.

Referring to FIG. 2, digital beamforming can be performed by performing precoding in a baseband process. Unlike FIG. 1, an RF chain includes a power amplifier. This is because a complex weight derived for beamforming is directly applied to a transmission data.

And, since the digital beamforming technique is able to differently perform beamforming according to a user, it is able to support multi user beamforming at the same time. Since the digital beamforming technique is able to perform independent beamforming according to a user to which an orthogonal resource is allocated, the digital beamforming technique has characteristics that scheduling flexibility is high and it is able to manage a transmitting end in accordance with a system purpose. Moreover, when a technique such as Multiple-Input Multiple-Output (MIMO)-OFDM (Orthogonal Frequency Division Multiplexing) is applied in a broadband transmission environment, it may form an independent beam for each subcarrier. Therefore, the digital beamforming technique can maximize the maximum transmission rate of a single user based on increased system capacity and enhanced beam gain.

In accordance with the aforementioned advantages and disadvantages, digital beamforming-based MIMO technology has been introduced in the current 3G/4G system.

DISCLOSURE OF THE INVENTION

Technical Task

Based on the aforementioned discussion, a method of transmitting a signal through a high frequency band in a wireless communication system and an apparatus therefor are proposed in the following.

Technical Solution

To achieve these and other advantages and in accordance with the purpose of the present invention, as embodied and broadly described, according to one embodiment, a method of transmitting a signal, which is transmitted by a transmitting end to a receiving end in a wireless communication system, includes the steps of receiving information on a first precoder and a second precoder for a channel between the transmitting end and the receiving end from the receiving end and transmitting a signal to the receiving end based on the first precoder. In this case, if reception quality of the receiving end based on the first precoder is equal to or greater than a threshold value, the signal can be transmitted to the receiving end based on the second precoder.

In this case, the first precoder may correspond to an Eigen value of a second size as a result of Eigen value decomposition of the channel between the transmitting end and the receiving end and the second precoder may correspond to an Eigen value of a first size as a result of Eigen value decomposition of the channel between the transmitting end and the receiving end.

Preferably, the information on the first precoder and the second precoder can include an indicator indicating that a path corresponding to the second precoder corresponds to a LoS (Line of Sight) path.

Additionally, the method can further include the step of receiving first channel quality information corresponding to the first precoder and second channel quality information corresponding to the second precoder from the receiving end. In this case, the first channel quality information may correspond to information on a channel except a path corresponding to the second precoder.

And, the method can further include the step of receiving information on reception quality of the receiving end based on the first precoder from the receiving end.

More preferably, if reception quality of the receiving end based on the second precoder is less than a threshold value after the signal is transmitted to the receiving end based on the second precoder, the signal can be transmitted to the receiving end based on the first precoder.

To further achieve these and other advantages and in accordance with the purpose of the present invention, according to a different embodiment, a method of receiving a signal, which is received by a receiving end from a transmitting end in a wireless communication, includes the steps of transmitting information on a first precoder and a second precoder for a channel between the transmitting end and the receiving end to the transmitting end, receiving a signal to which the first precoder is applied from the transmitting end, and transmitting information on reception quality of the signal to which the first precoder is applied to the transmitting end. In this case, if the reception quality of the signal to which the first precoder is applied is equal to or greater than a threshold value, a signal to which the second precoder is applied can be received.

In particular, the method can further include the step of performing Eigen value decomposition on the channel between the transmitting end and the receiving end. In this case, the first precoder may correspond to an Eigen value of a second size as a result of the Eigenvalue decomposition and the second precoder may correspond to an Eigen value of a first size as a result of the Eigenvalue decomposition.

Preferably, the method can further include the step of transmitting first channel quality information corresponding to the first precoder and second channel quality information corresponding to the second precoder to the transmitting end. In this case, the first channel quality information may correspond to information on a channel except a path corresponding to the second precoder.

More preferably, if reception quality of the signal to which the second precoder is applied is less than a threshold value after the signal to which the second precoder is applied is received, the signal to which the first precoder is applied can be received.

Advantageous Effects

According to embodiment of the present invention, it is able to efficiently remove fast shadowing capable of being occurred in high frequency band transmission.

It will be appreciated by persons skilled in the art that that the effects that can be achieved through the present invention are not limited to what has been particularly described hereinabove and other advantages of the present invention will be more clearly understood from the following detailed description.

BEST MODE FOR INVENTION

The configuration, operation and other features of the present invention will be understood by the embodiments of the present invention described with reference to the accompanying drawings.

Hereinafter, a Multiple-Input Multiple-Output (MIMO) system will be described. In the MIMO system, multiple transmission antennas and multiple reception antennas are used. By this method, data transmission/reception efficiency can be improved. That is, since a plurality of antennas is used in a transmitter or a receiver of a wireless communication system, capacity can be increased and performance can be improved. Hereinafter, MIMO may also be called "multi-antenna".

In the multi-antenna technique, a single antenna path is not used for receiving one message. Instead, in the multi-antenna technique, data fragments received via several antennas are collected and combined so as to complete data. If the multi-antenna technique is used, a data transfer rate may be improved within a cell region having a specific size or system coverage may be increased while ensuring a specific data transfer rate. In addition, this technique may be widely used in a mobile communication terminal, a repeater and the like. According to the multi-antenna technique, it is possible to overcome a limit in transmission amount of conventional mobile communication using a single antenna.

Figure 1:
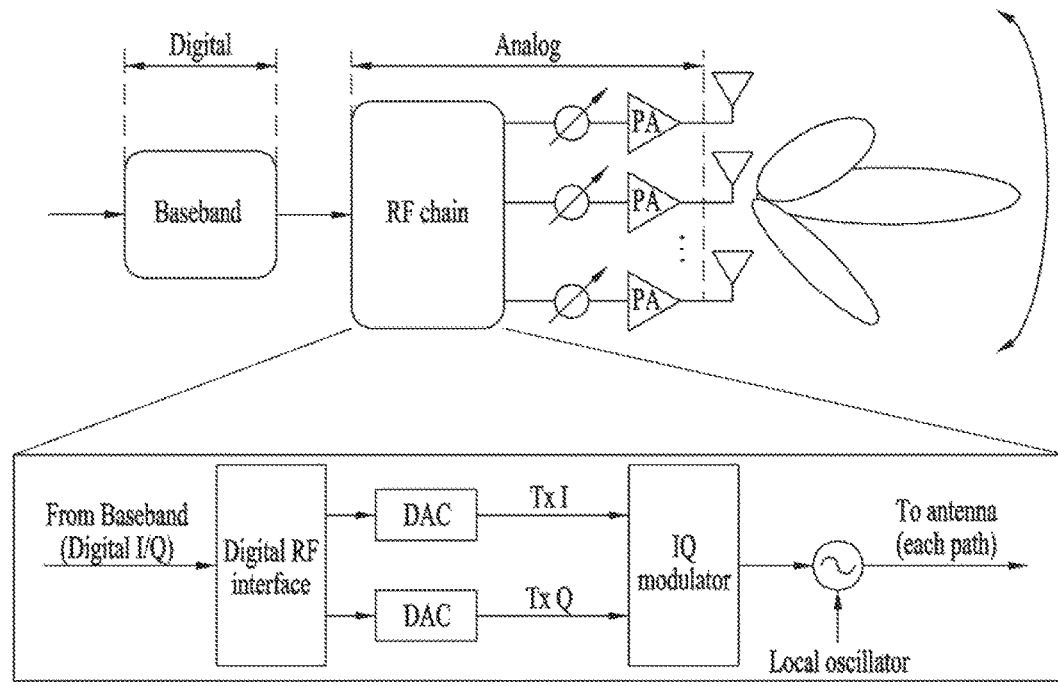
FIG. 1 is a diagram for an example of a legacy analog beamforming technique.
Figure 2:
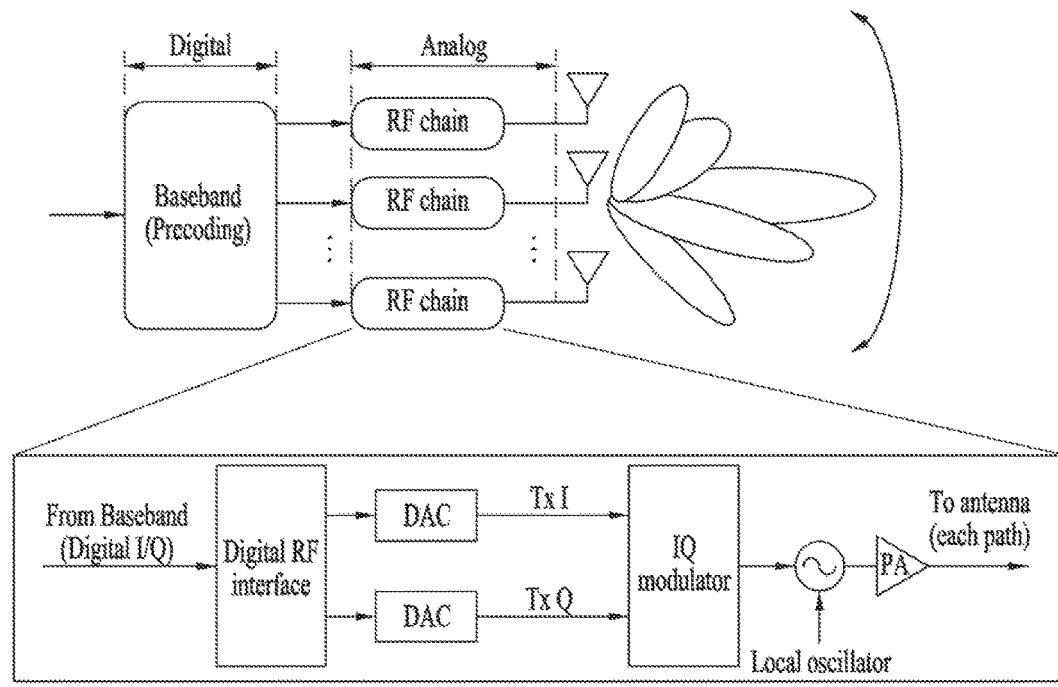
FIG. 2 is a diagram for an example of a legacy digital beamforming technique.
Figure 3:
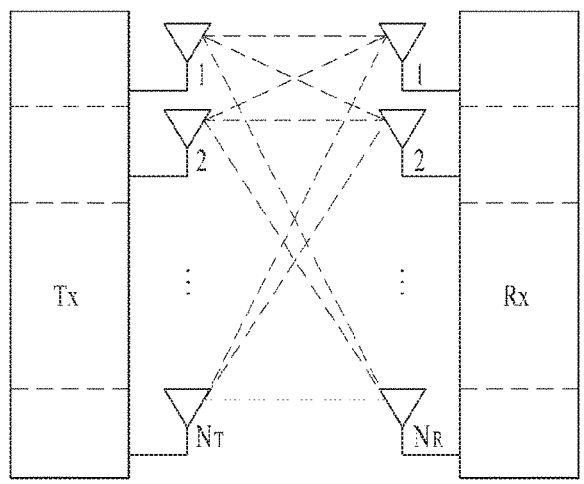
FIG. 3 is a diagram showing the configuration of a general multiple input multiple output (MIMO) system.

The configuration of the general multi-antenna (MIMO) communication system is shown in FIG. 3. $N_T$ transmission antennas are provided in a transmitter and $N_R$ reception antennas are provided in a receiver. If the multiple antennas are used in both the transmitter and the receiver, theoretical channel transmission capacity is increased as compared with the case where multiple antennas are used in only one of the transmitter or the receiver. The increase in the channel transmission capacity is proportional to the number of antennas. Accordingly, transfer rate is improved and frequency efficiency is improved. If a maximum transfer rate in the case where one antenna is used is $R_o$, a transfer rate in the case where multiple antennas are used can be theoretically increased by a value obtained by multiplying $R_o$ by a rate increase ratio $R_i$ as shown in Equation 1 below. Here, $R_i$ is the smaller of the two values $N_T$ and $N_R$.

$$R_i = \min(N_T, N_R) \qquad \text{[Equation 1]}$$

For example, in a MIMO system using four transmit antennas and four reception antennas, it is possible to theoretically acquire a transfer rate which is four times that of a single antenna system. After the theoretical increase in the capacity of the MIMO system was proved in the mid-1990s, various technologies of substantially improving a data transmission rate have been actively developed up to now. In addition, several technologies are already applied to the various radio communication standards such as the third-generation mobile communication and the next-generation wireless local area network (LAN).

According to the researches into the MIMO antenna up to now, various researches such as researches into information theory related to the computation of the communication capacity of a MIMO antenna in various channel environments and multiple access environments, researches into the model and the measurement of the radio channels of the MIMO system, and researches into space-time signal processing technologies of improving transmission reliability and transmission rate have been actively conducted.

The communication method of the MIMO system will be described in more detail using mathematical modeling. As shown in FIG. 3, it is assumed that $N_T$ transmit antennas and $N_R$ reception antennas are present. In transmitted signals, if the $N_T$ transmit antennas are present, the number of pieces of maximally transmittable information is $N_T$. The transmitted information may be expressed by a vector shown in Equation 2 below.

$$s = [s_1, s_2, \ldots, s_{N_T}]^T \quad \text{[Equation 2]}$$

The transmitted information $S_1, S_2, \ldots, S_{N_T}$ may have different transmit powers. If the respective transmit powers are $P_1, P_2, \ldots, P_{N_T}$, the transmitted information with adjusted powers may be expressed by a vector shown in Equation 3 below.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{S}$ may be expressed using a diagonal matrix P of the transmit powers as shown in Equation 4 below.

$$\hat{s} = \begin{bmatrix} P_1 & & 0 \\ & P_2 & \\ & & \ddots \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Considers that the $N_T$ actually transmitted signals $x_1, x_2, \ldots x_{N_T}$ are configured by applying a weight matrix W to the information vector $\hat{S}$ with the adjusted transmit powers. The weight matrix serves to appropriately distribute the transmitted information to each antenna according to a transport channel state, etc. Such transmitted signals $x_1, x_2, \ldots, x_{N_T}$ may be expressed by using a vector X as shown in Equation 5 below. $W_{ij}$ denotes a weight between an i-th transmit antenna and j-th information. W is also called a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i2} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_i \\ \vdots \\ \hat{s}_{N_T} \end{bmatrix} = W\hat{s} = WPs \quad \text{[Equation 5]}$$

In general, the physical meaning of the rank of the channel matrix may be a maximum number of elements capable of transmitting different information via a given channel. Accordingly, since the rank of the channel matrix is defined as the smaller of the number of independent rows or columns, the rank of the matrix is not greater than the number of rows or columns. The rank rank(H) of the channel matrix H is mathematically expressed by Equation 6.

$$\text{rank}(H) \leq \min(N_T, N_R) \quad \text{[Equation 6]}$$

In addition, different information transmitted using the MIMO technology is defined as "transmitted stream" or "stream". Such "stream" may be referred to as "layer". Then, the number of transmitted streams is not greater than the rank which is a maximum number capable of transmitting different information. Accordingly, the channel rank H is expressed by Equation 7 below.

$$\text{\# of streams} \leq \text{rank}(H) \leq \min(N_T, N_R) \quad \text{[Equation 7]}$$

where, "# of streams" denotes the number of streams. It should be noted that one stream may be transmitted via one or more antennas.

There are various methods for associating one or more streams with several antennas. These methods will be described according to the kind of the MIMO technology. A method of transmitting one stream via several antennas is referred to as a spatial diversity method and a method of transmitting several streams via several antennas is referred to as a spatial multiplexing method. In addition, a hybrid method which is a combination of the spatial diversity method and the spatial multiplexing method may be used.

In the following, a massive MIMO environment in which the number of transmission and reception antennas is considerably increased is explained. In general, in cellular communication, it is assumed that maximum 8 transmission/reception antennas are applied to a MIMO environment. However, as evolving into massive MIMO, the number of antennas may increase more than dozens or several hundreds of antennas.

If a digital beamforming technique is applied in a massive MIMO environment, since it is necessary to perform signal processing on hundreds of antennas for digital signal processing of a transmitting end through a baseband process, signal processing complexity becomes very complex and hardware implementation complexity becomes very complex because RF chains as many as the number of antennas are necessary. In addition, since it is necessary to perform independent channel estimation on all antennas and have feedback information on a huge MIMO channel consisting of all antennas in case of a FDD (frequency division duplex) system, a pilot and a feedback overhead become very big. On the other hand, if an analog beamforming technique is applied in the massive MIMO environment, hardware complexity of a transmitting end is relatively low, but performance enhancement using multiple antennas is insignificant and flexibility of resource allocation is degraded. In particular, in case of performing broadband transmission, it is very difficult to control a beam according to a frequency.

Therefore, in the massive MIMO environment, it is necessary to have a scheme of configuring a transmitting end of a hybrid type that an analog beamforming structure and a digital beamforming structure are combined instead of exclusively selecting one of the analog beamforming and the digital beamforming techniques Table 1 in the following shows relationship between a performance gain and complexity of the analog beamforming technique and the digital beamforming technique. It is necessary to design a structure of a transmitting end of a hybrid type capable of reducing the hardware implementation complexity of the transmitting end and maximizing a beamforming gain using the massive antenna based on the relationship.

TABLE 1

|  | Easy of beam-forming accuracy control | Multi-carrier beam control | Multi-stream transmission | Hardware complexity (BB process) | Pilot and feedback overhead |
|---|---|---|---|---|---|
| Analog beam-forming technique | low | impossible or difficult | impossible or difficult | low | low |
| Digital beam-forming technique | high | possible | possible | high | high |

In the following, hybrid beamforming is explained in more detail.

Figure 4:
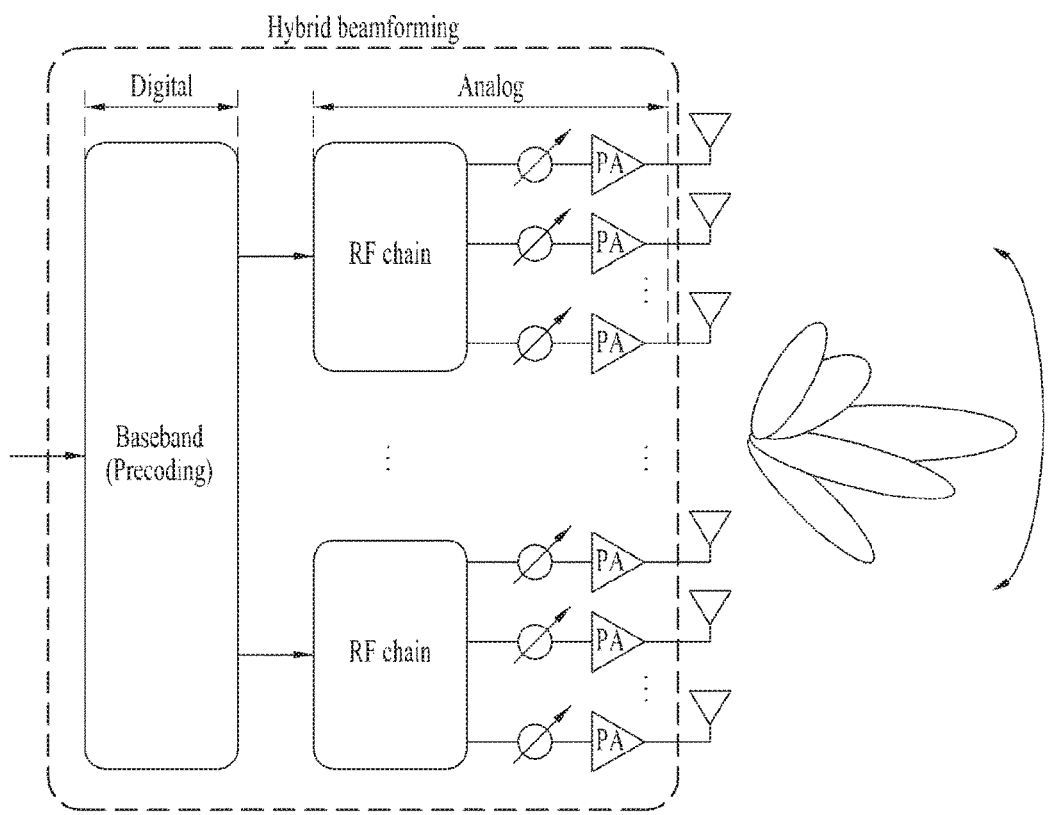
FIG. 4 is a diagram for explaining a concept of hybrid beamforming.

The hybrid beamforming is performed to configure a transmitting end capable of reducing hardware complexity and achieving characteristics of the analog beamforming technique and advantages of the digital beamforming technique. FIG. 4 is a diagram for explaining a concept of hybrid beamforming.

Referring to FIG. 4, the hybrid beamforming is a structure that performs coarse beamforming using the analog beamforming technique and performs multi-stream or multi-user transmission using the digital beamforming technique. Consequently, the hybrid beamforming has a structure for simultaneously performing the analog beamforming technique and the digital beamforming technique to lower implementation complexity of a transmitting end or hardware complexity. Basically, technical issues of the hybrid beamforming are described in the following.

Optimization considering both analog and digital beamforming at the same time has the following difficulties. Basically, the digital beamforming has an identical time-frequency resource and can apply an independent beamforming technique to each user. On the contrary, the analog beamforming has a limitation that it is necessary to apply a common beamforming technique with an identical time-frequency resource. Hence, the limitation causes such an optimization constraint as the number of supported ranks, beam control flexibility, beamforming decomposition, and the like.

The analog beamforming technique, which forms a beam only in a specific direction in the same time-frequency resource, is unable to perform multiple beamforming in all UEs directions at the same time. Hence, there is a problem that it is impossible to simultaneously transmit a UL/DL control channel, a reference signal, a synchronization signal, and the like to all UEs capable of being distributed to all areas of a cell.

In case of performing estimation on an analog/digital beam, although the digital beam is able to use a legacy orthogonal pilot allocation scheme as it is, the analog beam requires a predetermined time-duration as many as the number of beam candidates. This means that time delay required for the analog beam estimation is not small. And, if the analog beam and the digital beam are estimated at the same time, complexity can be considerably increased.

Lastly, while the digital beamforming technique is able to easily perform beamforming for multi-user/stream, the analog beamforming technique performs same beamforming on the entire transmission band. Hence, it is difficult to perform independent beamforming according to a user or a stream. In particular, since it is difficult to support FDMA (e.g., OFDMA) through orthogonal frequency resource allocation, it may be difficult to achieve optimization of frequency resource efficiency.

In the following, mmWave (millimeter-wave), which is a field to which the present invention is mainly applied, is explained.

Figure 5:
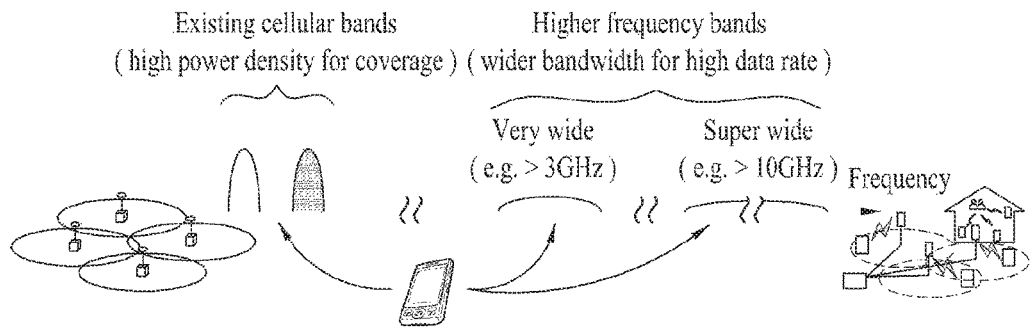
FIG. 5 is a conceptual diagram for next generation frequency domain allocation through high frequency band securement.

FIG. 5 is a conceptual diagram for next generation frequency domain allocation through high frequency band securement.

In the next generation 5G communication system, a new spectrum is being considered to achieve a transmission rate of dozens of Gbps. For example, as shown in FIG. 5, an mmWave band using a center frequency of dozens of GHz rather than a legacy cellular band is considered as one of the strongest candidate bands.

Since the mmWave band has a center frequency higher than a legacy 2 GHz cellular band, a higher path loss occurs in the mmWave band. Equation 8 in the following shows a path loss in a high frequency environment.

$$P_{RA}(d) = P_t + G_t + G_r - 32.44 - 20 \log_{10}(f_{c,GHz} \cdot d_m) - L_{exv}$$ [Equation 8]

In Equation 8, $P_t$ is transmission power, $G_t$ is transmission antenna gain, $G_r$ is reception antenna gain, $d_m$ is distance between transmission end and receiving end, $f_c$ is carrier (or center) frequency and $P_{RA}(d)$ is reception power according to distance between transmission end and receiving end. Referring to Equation 8, it is able to see that, if a center frequency is increased to dozens of GHz compared to a legacy 2 GHz band, a path loss of dozens of dB additionally occurs. In addition, in case of a high frequency band, environment loss additionally occurs according to humidity of the atmosphere, dust, precipitation, and weather condition. A parameter for representing the loss corresponds to $L_{exv}$. The parameter has a range approximately ranging from 4 dB to 40 dB.

Figure 6:
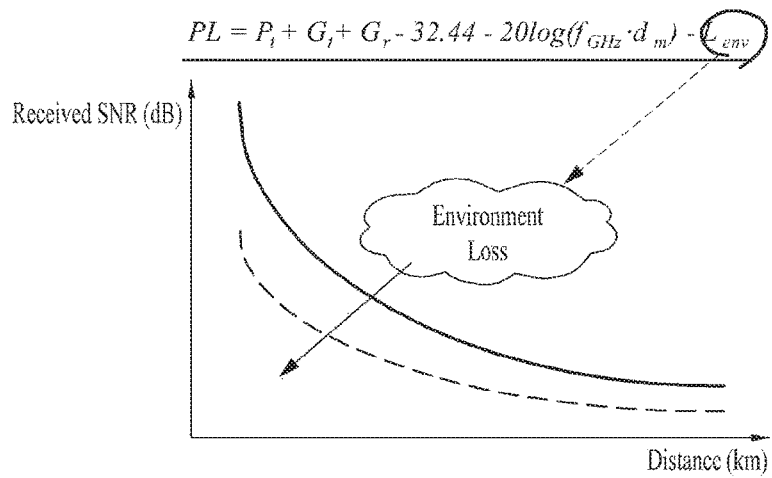
FIG. 6 is a conceptual diagram for the increase of the total path loss which occurs due to an additional environment loss in high frequency environment.

FIG. 6 is a conceptual diagram for the increase of the total path loss which occurs due to an additional environment loss in high frequency environment.

Referring to FIG. 6, it is able to see that the mmWave band has an additional path loss in a high frequency band compared to a legacy commercial cellular band. In particular, on the basis of a base station having a limited transmit power, in order for a UE to secure stable reception quality, a small cell having small service coverage may become a suitable cell deployment scenario.

An additional small unit characteristic of the mmWave band can be mainly divided into a delay spread and a Doppler frequency change. In the mmWave band, it is able to examine that multi-path caused by multipath delay becomes shorter compared to a legacy commercial frequency band. In addition, the last path delay of the multi-path does not exceed 500 ns.

In a general cellar system, maximum delay is 5 us on the basis of LTE system. Table 2 in the following shows that RMS (Root Mean Square) delay spread is about 134.57 ns which has been significantly lowered compared to the legacy cellular band. Table 2 shows propagation characteristics of the mmWave band. Since the mmWave band has a wider coherence bandwidth compared to the legacy commercial band, it is able to anticipate that a channel is going to be static in a bigger unit in frequency domain.

TABLE 2

| Characteristic | Urban1 | Urban2 | Suburban | Rural |
|---|---|---|---|---|
| lcr$_{40dB}$ | 3.22 | 2.1 | 3.78 | 3.36 |
| afd$_{40dB}$ | 0.015 | 0.014 | 0.015 | 0.015 |
| Mean Delay (ns) | 70.41 | 48.08 | 46.41 | 45.41 |
| Delay Spread (ns) | 134.57 | 30.32 | 12.75 | 9.05 |
| ConBW (MHz) | 5.0 | 9.46 | 14.0 | 14.91 |
| K-Factor (dB) | 10.13 | 10.38 | 14.28 | 14.86 |

Figure 7:
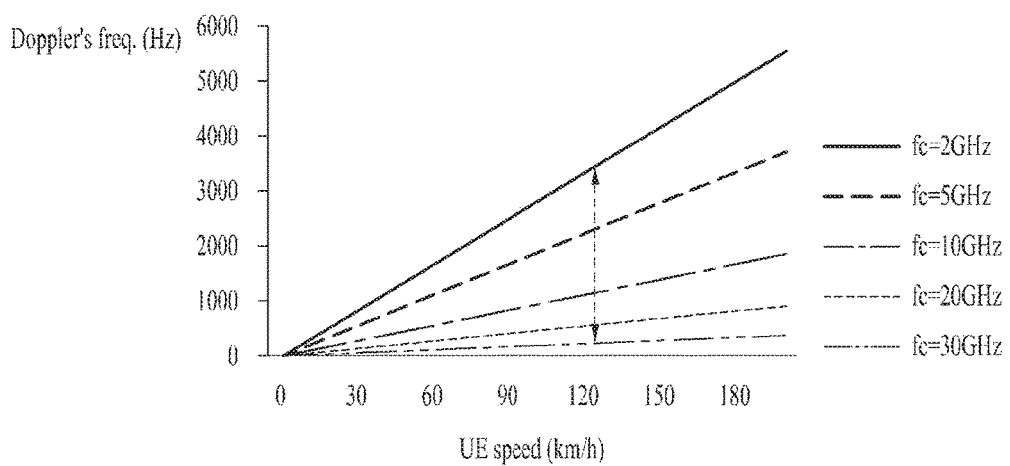
FIG. 7 is a diagram for Doppler's frequency according to moving speed of UE and center frequency.

Lastly, the mmWave band has time-varying channel characteristic for a Doppler frequency larger than that of the legacy commercial band. The Doppler frequency according to a center frequency and moving speed of a UE can be represented by equation 9 in the following. FIG. 7 is a diagram for Doppler frequency according to moving speed of UE and a center frequency.

$$f_{d,max} = \frac{v \cdot f_c}{c} \quad \text{[Equation 9]}$$

In Equation 9, $F_{d,max}$ is Doppler frequency, v is velocity of UE, $f_c$ is carrier (or center) frequency and c is velocity of light. Referring to equation 9 and FIG. 7, it is able to see that the Doppler frequency is significantly increasing according to the increase of the center frequency under the same moving speed of a UE. Although the UE moves slowly, the Doppler frequency is considerably increased in the mmWave band. Hence, it is able to see that time-varying characteristic of a channel increases as well.

Communication performed on the mmWave band corresponds to communication using a relatively high center frequency as wide as dozens of GHz and has a characteristic that a path loss is greater than that of a legacy cellular system using a central frequency equal to or narrower than 3 GHz. In particular, since signal power attenuation equal to or greater than dozens of dB occurs between LoS (Line of Sight) and NLoS (Non-LoS) path in the mmWave band communication, if LoS/NLoS path is rapidly changed, a communication link can be disconnected.

In order to compare path-loss according to the LoS path with path-loss according to the NLos path of the mmWave band, it may use equation 10 in the following.

$$PL(d) = PL_{free}(d_0) + 10 \cdot n \cdot \log_{10}\left(\frac{d}{d_0}\right) \quad \text{[Equation 10]}$$

Figure 8:
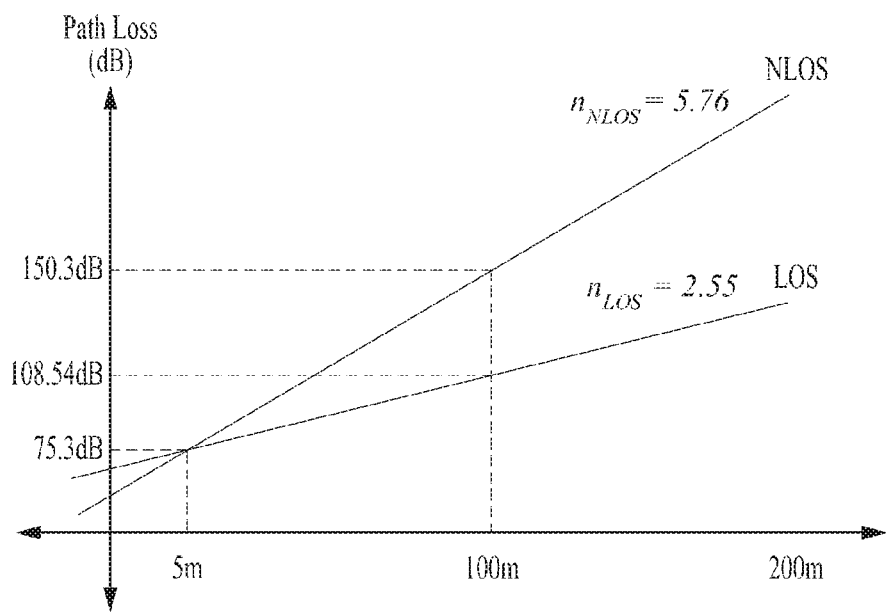
FIG. 8 is a graph indicating a path loss according to a path attenuation index of LoS/NLoS.

In Equation 10, $d_0$ is reference distance for measuring a signal, d is distance between a transmission end and a receiving end, n is a path-loss coefficient according to a radio wave environment, PL(d) is a path-loss value according to "d" and $PL_{free}(d_0)$ is a path-loss value according to "$d_0$." Referring to Equation 10, only free space path attenuation, a path attenuation index, and a path loss according to a distance are illustrated without illustrating transmission/reception antenna gain, an attenuation component according to a center frequency, and the like. In general, path attenuation of NLoS is greater than path attenuation of LoS and a difference between the path attenuation of NLoS and the path attenuation of LoS increases as a high frequency band is approached such as the mmWave band. FIG. 8 is a graph indicating a path-loss according to a path attenuation index of LoS/NLoS.

In general, the mmWave band considers a service coverage smaller than a service coverage of a legacy low frequency cellular band. Hence, it is necessary to analyze path loss due to LoS/NLoS in a dense urban scenario. If it is assumed that a path attenuation index is obtained as $n_{LOS}$=2.55, $n_{NLOS}$=5.76 through measurement-based channel modelling in the general 28 GHz mmWave band, it can be predicted that a difference between LoS path loss and NLoS path loss theoretically occurs as much as about 40 dB near 100 m from a base station. Hence, if a rapid link change occurs between LoS and NLoS due to a sudden shadowing in the dense urban communication environment, since it is unable to secure link quality due to a path attenuation difference, continuity of communication may not be guaranteed.

As mentioned in the foregoing description, in the mmWave band, path loss varies depending on the LoS/NLoS path. This is because, since a path loss index of a reflection wave is big on a high frequency band, such a relationship as $n_{NLOS} \gg n_{LOS}$ is established in general. And, due to the characteristics of the mmWave band, among the multipath channels, the number of meaningful paths capable of maintaining stable communication is limited.

Therefore, it is able to anticipate that a radio channel is also valid for a specific path only in the environment. In particular, if a radio channel of the mmWave band is decomposed, it is able to see that a channel gain is concentrated on a specific space. For example, equation 11 in the following shows that SVD (singular value decomposition) is performed on a radio channel H of size $N_r \times N_t$.

$$H = U \Sigma V^H \quad \text{[Equation 11]}$$

Referring to equation 11, a radio channel H having a size of $N_r \times N_t$ is decomposed into an input singular matrix U corresponding to a unitary matrix having a size of $N_r \times N_r$, an output singular matrix V corresponding to a unitary matrix having a size of $N_t \times N_t$, and a diagonal matrix $\Sigma$ having a size of $N_r \times N_t$ that has Eigen values as diagonal components. In this case, the $\Sigma$ is represented as equation 12 in the following. In general, it is assumed that the number of transmission antennas is greater than the number of reception antennas in a massive MIMO system.

$$\Sigma = [\Sigma_1 \ O] = \begin{bmatrix} \sigma_1 & & & \\ & \sigma_2 & & O \\ & & \ddots & \\ & & & \sigma_{N_r} \end{bmatrix} \quad \text{[Equation 12]}$$

In this case, due to the multipath characteristic of the mmWave, there is a limit in generating an independent parallel channel. In this case, a channel of LoS path having a greatest channel gain and a part of NLoS path having a low channel gain can be generated as independent parallel channels. Due to the characteristic, each Eigen value may have relationship shown in equation 13 in the following.

$$\underbrace{\sigma_1}_{Los} \gg \underbrace{\sigma_2 > \sigma_3}_{Nlos} > \sigma_4 = \sigma_5 = \ldots = 0 \quad \text{[Equation 13]}$$

As a result, although most part of a channel gain is concentrated on a first Eigen value, at least second and third Eigen value may also have a meaningful channel gain for communication. Hence, it is able to assume that the mmWave corresponds to environment in which a single LoS channel having a big channel gain and one or two NLoS parallel channels having a relatively small channel gain are formed at least. Consequently, it may assume that such a relationship as equation 14 in the following is established between a channel gain and an Eigen value.

$$\|H\|^2 \approx \sigma_1^2 + \sigma_2^2 + \sigma_3^2 \qquad \text{[Equation 14]}$$

In this case, if a communication environment includes a sudden shadowing variation, the environment can be interpreted as an environment in which a LoS path among LoS and NLoS channels appears or disappears due to such an obstacle as a building or the like. Consequently, it indicates that a channel having a first Eigen value is rapidly generated or disappeared. And, in the mmWave band, since a big path loss difference as much as about 40 dB may occur between LoS and NLoS on the basis of 100 m service coverage, if a relatively good channel suddenly disappears, communication can be disconnected. Therefore, it is necessary to have a method capable of maintaining stable communication of a certain level while overcoming the loss of LoS/NLoS path.

The present invention proposes a beamforming technique capable of providing stable communication continuity while relatively lowering communication quality degradation due to sudden shadowing based on information on an NLoS path which is not suddenly changed by an obstacle.

Embodiment 1

In the first embodiment of the present invention, it is proposed that a base station performs beamforming appropriate for the first strongest path. If a channel gain fed back from a UE suddenly changes, the present invention proposes that the base station performs beamforming appropriate for the second strongest path which is secured in advance.

To this end, it is necessary to design a precoder F. First of all, a reception signal is represented as equation 15 in the following.

$$y = HFx + n \qquad \text{[Equation 15]}$$
$$= U\Sigma V^H Fx + n$$

In equation 15, y corresponds to a reception signal vector of a size of $N_r \times 1$, x corresponds to a transmission signal vector of a size of $N_s \times 1$, F corresponds to a precoder of a size of $N_t \times N_s$, and $N_s$ corresponds to the number of multiple streams.

In the mmWave band, it is advantageous to maximize a beamforming gain using multiple antennas rather than transmit multiple streams at the same time in compensating for a path loss due to a relatively high center frequency. Therefore, the present invention is explained based on a method of managing a rank 1-based precoder.

As mentioned in the foregoing description, a precoder corresponding to the greatest Eigen value $\sigma_1$ becomes $F = v_1$. Consequently, the precoder becomes a precoder for maximizing a channel gain for a LoS-based path corresponding to the strongest path. A precoder corresponding to a NLoS-based Eigen value $\sigma_2$ or $\sigma_3$, which is a second strongest path, becomes $F = v_2$ or $F = v_3$.

If LoS-based precoding is performed, a final beam gain can be represented as equation 16 in the following. In particular, since v corresponds to a unitary matrix in equation 16, it can be represented as $v_i^H \times v_j = 1 (i=j)$ and $v_i^H \times v_j = 0$ ($i \neq j$) for $v_i, v_j \in V$. Hence, simplification is available. Since U is a unitary matrix as well, the same principle can be applied.

$$U^H y = U^H HFx + U^H n \to U^H HF \qquad \text{[Equation 16]}$$
$$= U^H U \Sigma V^H F$$
$$= U^H U \begin{bmatrix} \sigma_1 & & & \\ & \sigma_2 & & O \\ & & \ddots & \\ & & & \sigma_{N_r} \end{bmatrix} V^H v_1$$
$$= U^H U \begin{bmatrix} \sigma_1 \\ 0 \\ \vdots \\ 0 \end{bmatrix}$$
$$= \begin{bmatrix} \sigma_1 \\ 0 \\ \vdots \\ 0 \end{bmatrix} \to \sigma_1$$

Referring to equation 16, it is able to see that a maximum channel gain is obtained by transmitting a single stream with maximum power through a LoS channel.

Similarly, if a NLoS-based Eigen value precoder $F = v_2$ is identically developed, it can be represented as equation 17 in the following.

$$U^H y = U^H HFx + U^H n \to U^H HF \qquad \text{[Equation 17]}$$
$$= U^H U \Sigma V^H F$$
$$= U^H U \begin{bmatrix} \sigma_1 & & & \\ & \sigma_2 & & O \\ & & \ddots & \\ & & & \sigma_{N_r} \end{bmatrix} V^H v_2$$
$$= U^H U \begin{bmatrix} 0 \\ \sigma_2 \\ \vdots \\ 0 \end{bmatrix}$$
$$= \begin{bmatrix} 0 \\ \sigma_2 \\ \vdots \\ 0 \end{bmatrix} \to \sigma_2$$

Referring to equation 17, it is able to see that a second highest channel gain is obtained by transmitting a single stream with maximum power through an NLoS channel.

In this situation, a UE can feed back a beamforming vector having the greatest channel gain and a second highest beamforming vector among beamforming vectors to a base station. As mentioned in the foregoing description, a transmitting end uses a v matrix to perform SVD-based precoding. As a result, a UE selects a vector $v_i$ corresponding to the several numbers of Eigenvalues from among the v matrix and feedbacks the vector. For example, as shown in equation 18 in the following, the UE feeds back both a beamforming vector $v_1$ corresponding to LoS and a precoding vector $v_2$ corresponding to NLoS among the V matrix to the base station. In some cases, the UE may feedback a vector described in the following to the base station as well.

$$V = \underbrace{[v_1}_{Los} \underbrace{v_2\ v_3\ v_4}_{Nlos} \cdots\ v_{N_r}]$$ [Equation 18]

Or, the UE can feed back an amount of change of reception quality of the first beamforming vector to the base station. If the strongest path-based reception quality changes, it may assume that the LoS path experiences a sudden shadowing situation. Therefore, the UE estimates the amount of change of the reception quality and feeds back the amount of change to the base station to perform a suitable beam change in a communication situation of the sudden shadowing situation. Various estimation values can be used to measure the reception quality. The most representative value is the reception SNR. An example of the reception SNR-based feedback estimated by the UE is described in the following.

1) SNR distribution or standard deviation value over a specific time interval (refer to equation 19 in the following)

$$\frac{1}{T}\sum_{t=T_0}^{T_0+T-1}(SNR_t - E\{SNR\})^2$$ [Equation 19]

Where, $E\{SNR\} = \frac{1}{T}\sum_{t=T_0}^{T_0+T-1} SNR_t$ or $$E\{SNR\} = \frac{1}{T_0+T-1}\sum_{t=T_0}^{T_0+T-1} SNR_t,$$

measurement time index, $T_0$: measurement start time, T: measurement duration

2) SNR variation over a specific time interval (refer to equation 20 in the following)

$$|SNR_{T_i} - SNR_{T_0}|$$ [Equation 20]

Where, $T_0$: reference time, $T_1$: reporting time

3) SNR variation to which weight is applied (refer to equation 21 in the following)

$$\left|\sum_{t=T_0+1}^{T_1} w_t(SNR_t - SNR_{t-1})\right|$$ [Equation 21]

Where, $w_t$ is weight at time t.

4) Variation of SNR average value (refer to equation 22 in the following)

$$\frac{1}{T}\left|\sum_{t=T_2}^{T_2+T-1} SNR_t - \sum_{t=T_0}^{T_0+T-1} SNR_t\right|$$ [Equation 22]

Where, $T_2+T-1$=reporting time ($T_1$)

Of course, in the aforementioned 1) to 4), not only the SNR but also channel capacity, throughput, CQI, or a change anticipation value of MCS (modulation and coding scheme) can be utilized as feedback information.

Or, if the reception quality change amount changed by the first beamforming vector fed back from the UE is equal to or greater than a specific reference value, the base station determines it as a sudden shadowing change situation and may be able to perform beamforming using a second highest beamforming vector. In particular, the base station performs beamforming using such a second highest NLoS channel as $F=v_2$ or $F=v_3$ by avoiding the beamforming vector affected by the sudden shadowing change. For example, if the reception SNR change amount of the beamforming for the strongest path fed back from the UE is equal to or greater than a reference value, the base station changes to beamforming for the second-best path.

In order for the base station to measure the change amount of the reception quality, the base station may determine the change amount on the basis of a change of uplink quality or a change amount of reception quality information (e.g., CQI) fed back by the UE. Or, when the UE transmits NACK information to the base station, the UE may transmit reception quality information based on a prescribed reference signal or an MCS value preferred by the UE to the base station together with the NACK information to make the base station measure the change amount of the reception quality information. In this case, the UE may feedback CQI in accordance with the strongest path and CQI in accordance with the second-best path to the base station at the same time to configure a stable MCS to prepare for a sudden path change.

Embodiment 2

In the second embodiment of the present invention, it is proposed that a second-best path is defined by a fall-back mode to make the second-best path independent from a path change due to a sudden shadowing change when multiple ranks are transmitted. In particular, communication may be performed using the strongest path in order to enhance stability of communication if the shadowing change is equal to or less than a threshold value even though the second best path is preferentially used.

Figure 9:
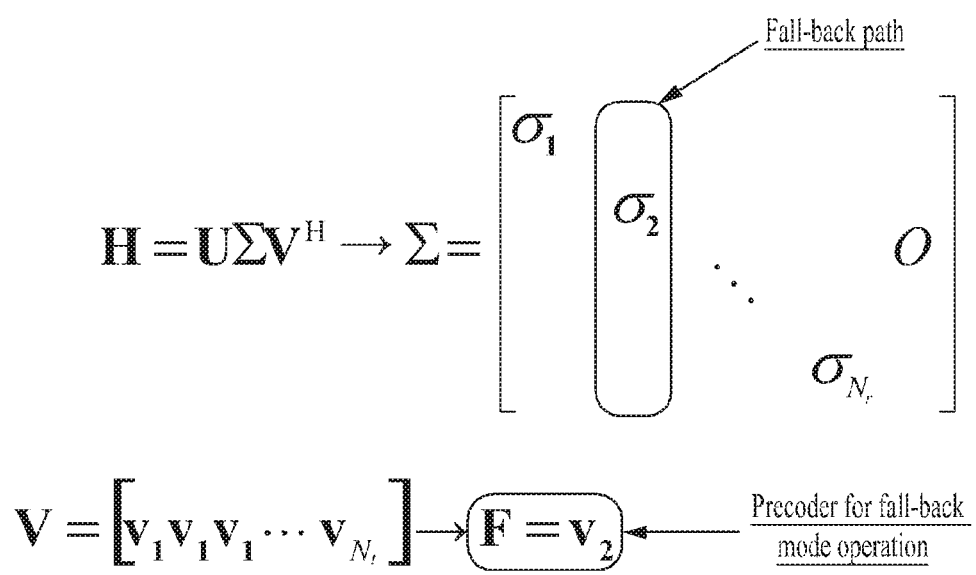
FIG. 9 is a diagram for an example of a fall-back mode operation through NLoS path according to embodiment of the present invention.

FIG. 9 is a diagram for an example of a fall-back mode operation through NLoS path according to embodiment of the present invention. Referring to FIG. 9, it is able to see that a path having $\sigma_2$ as Eigen value is operated in fall-back mode.

Additionally, according to the second embodiment of the present invention, it is preferable for a UE to separately calculate CQI according to whether or not the strongest path is included to perform multi-rank transmission and feedback the CQI to a base station.

Figure 10:
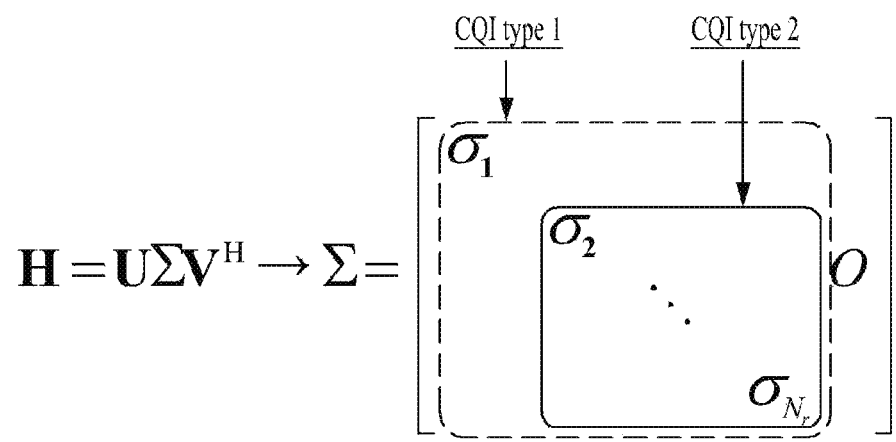
FIG. 10 is a conceptual diagram for calculating multi-path-based CQI depending on whether or not there is the strongest path according to embodiment of the present invention.

FIG. 10 is a conceptual diagram for calculating multi-path-based CQI depending on whether or not there is the strongest path according to embodiment of the present invention.

Referring to FIG. 10, it is able to assume that ranks of multi-path channels are identical to the number of ranks having Eigen value equal to or greater than a prescribed reference value. Hence, when multiple ranks are transmitted, the strongest path has the greatest Eigen value and experiences whether or not the path is disappeared according to sudden shadowing at the same time. Therefore, it is preferable to define a separate CQI according to a rank and calculate CQI according to each situation.

More preferably, a UE can feedback a path corresponding to LoS among multiple paths to a base station using separate indication information. In general, when SVD is performed, the UE may assume that a path having the greatest Eigen value corresponds to the LoS. When SVD-based transmission precoding is performed, the aforementioned assumption is valid. However, in case of performing digital beamforming using a general codebook, it may be difficult to precisely identify the LoS. Hence, the UE estimates CQI for each PMI and reception SNR and may be then able to assume a PMI having a greatest gain as the LoS. It is preferable that the UE preferentially assumes the PMI as the LoS and feedbacks an indicator indicating the LoS to the base station.

The aforementioned proposal is described on the basis of a downlink scenario that a base station transmits a signal to a UE, by which the present invention may be non-limited. The present technique can be applied to a combination of a random transmitter and a receiver. For example, the technique can be applied to an uplink scenario that a UE transmits a signal to a base station, a scenario that a signal is transmitted between UEs, and a scenario that a signal is transmitted between base stations.

Figure 11:
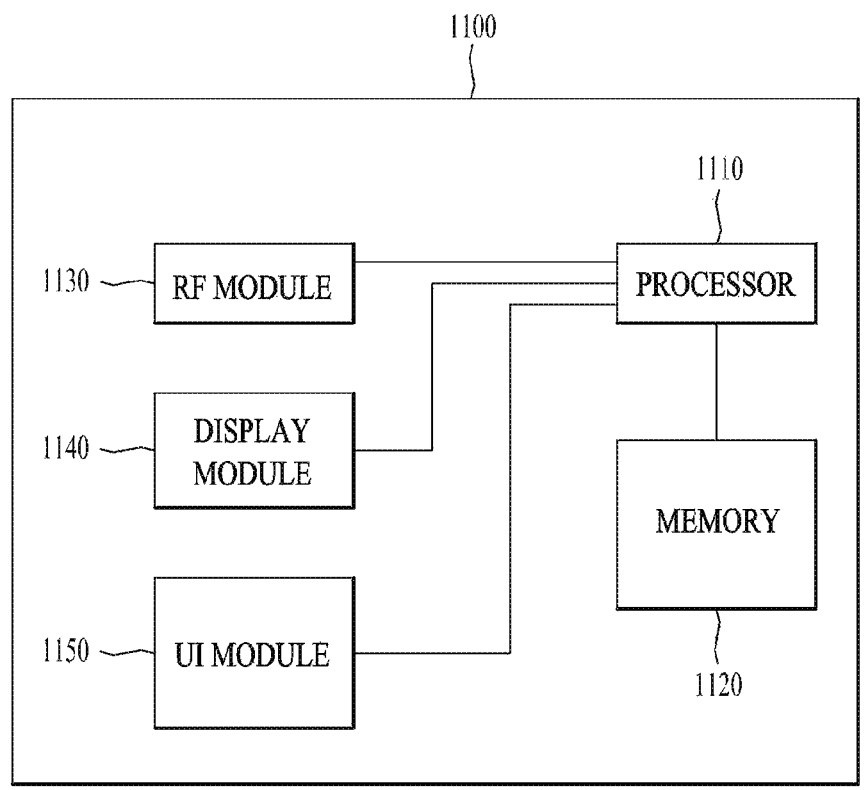
FIG. 11 is a block diagram of a communication apparatus according to one embodiment of the present invention.

FIG. 11 is a block diagram of a communication apparatus according to one embodiment of the present invention.

Referring to FIG. 11, a communication apparatus 1100 includes a processor 1110, a memory 1120, a Radio Frequency (RF) module 1130, a display module 1140 and a user interface module 1150.

The communication apparatus 1100 is shown for convenience of description and some modules thereof may be omitted. In addition, the communication apparatus 1100 may further include necessary modules. In addition, some modules of the communication apparatus 1100 may be subdivided. The processor 1110 is configured to perform an operation of the embodiment of the present invention described with reference to the drawings. For a detailed description of the operation of the processor 1110, reference may be made to the description associated with FIGS. 1 to 10.

The memory 1120 is connected to the processor 1110 so as to store an operating system, an application, program code, data and the like. The RF module 1130 is connected to the processor 1110 so as to perform a function for converting a baseband signal into a radio signal or converting a radio signal into a baseband signal. The RF module 1130 performs analog conversion, amplification, filtering and frequency up-conversion or inverse processes thereof. The display module 1140 is connected to the processor 1110 so as to display a variety of information. As the display module 1140, although not limited thereto, a well-known device such as a Liquid Crystal Display (LCD), a Light Emitting Diode (LED), or an Organic Light Emitting Diode (OLED) may be used. The user interface module 1150 is connected to the processor 1110 and may be configured by a combination of well-known user interfaces such as a keypad and a touch screen.

The above-described embodiments are proposed by combining constituent components and characteristics of the present invention according to a predetermined format. The individual constituent components or characteristics should be considered optional on the condition that there is no additional remark. If required, the individual constituent components or characteristics may not be combined with other components or characteristics. In addition, some constituent components and/or characteristics may be combined to implement the embodiments of the present invention. The order of operations disclosed in the embodiments of the present invention may be varied. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

In this document, a specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the terms fixed station, Node B, eNode B (eNB), access point, etc.

The embodiments of the present invention can be implemented by a variety of means, for example, hardware, firmware, software, or a combination thereof. In the case of implementing the present invention by hardware, the present invention can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of transmitting a signal by a base station (BS) in a wireless communication system, the method comprising:
    receiving, from a user equipment (UE), first information related to a first precoder and a second precoder;
    precoding a first signal based on the first precoder and transmitting the precoded first signal to the UE;
    receiving second information related to a reception quality of the transmitted precoded first signal;
    determining an amount of change in the reception quality based on the received second information; and
    precoding a second signal using the second precoder and transmitting the precoded second signal to the UE when the determined amount of change is equal to or greater than a threshold value,
    wherein each of the first and the second precoders is a matrix for precoding the signal.

2. The method of claim 1, wherein:
    the first precoder corresponds to an Eigen value having a largest value resulting from an Eigen value decomposition of a channel between the BS and the UE; and
    the second precoder corresponds to an Eigen value having a second largest value resulting from the Eigen value decomposition.

3. The method of claim 1, further comprising transmitting a signal precoded by the first precoder to the UE when an amount of change in a reception quality related to the transmitted second precoded signal is greater than the threshold value.

4. A method of receiving a signal by a user equipment (UE) in a wireless communication, the method comprising:
- transmitting, to a base station (BS), first information related to a first precoder and a second precoder;
- receiving a first signal precoded by the first precoder from the BS;
- determining an amount of change in a reception quality of the received first signal based on a reference signal included in the received first signal;
- transmitting, to the BS, second information related to the determined amount of change in the reception quality; and
- receiving a second signal precoded by the second precoder from the BS when the determined amount of change is equal to or greater than a threshold value.

5. The method of claim 4, further comprising performing an Eigen value decomposition on a channel between the BS and the UE before transmitting the second information, wherein:
- the first precoder corresponds to an Eigen value having a largest value resulting from the Eigen value decomposition; and
- the second precoder corresponds to an Eigen value having a second largest value resulting from the Eigen value decomposition.

6. The method of claim 4, further comprising receiving a signal precoded by the first precoder from the BS when an amount of change in a reception quality corresponding to the received second precoded signal is greater than the threshold value.

* * * * *